US012243091B2

(12) United States Patent
Turnbull et al.

(10) Patent No.: US 12,243,091 B2
(45) Date of Patent: Mar. 4, 2025

(54) SYNCHRONIZED INTERACTIVE VOICE RESPONSE SYSTEM AND GRAPHICAL USER INTERFACE FOR AUTOMATED ROADSIDE SERVICE

(71) Applicant: Allstate Insurance Company, Northbrook, IL (US)

(72) Inventors: Paul R. Turnbull, Chicago, IL (US); Anthony Banks, Northbrook, IL (US); Brinderjit Singh, Buffalo Grove, IL (US)

(73) Assignee: Allstate Insurance Company, Northbrook, IL (US)

( * ) Notice: Subject to any disclaimer, the term of this patent is extended or adjusted under 35 U.S.C. 154(b) by 403 days.

(21) Appl. No.: 16/887,413

(22) Filed: May 29, 2020

(65) Prior Publication Data

US 2021/0272183 A1 Sep. 2, 2021

Related U.S. Application Data

(60) Provisional application No. 62/855,827, filed on May 31, 2019.

(51) Int. Cl.
*G06Q 30/00* (2023.01)
*G06F 3/16* (2006.01)
(Continued)

(52) U.S. Cl.
CPC ......... *G06Q 30/0635* (2013.01); *G06F 3/167* (2013.01); *G06Q 30/0613* (2013.01);
(Continued)

(58) Field of Classification Search
CPC ............... G06Q 30/00; G06Q 30/0601; G06Q 30/0623; G06Q 30/0625; G06Q 30/0633; G06Q 30/0641
See application file for complete search history.

(56) References Cited

U.S. PATENT DOCUMENTS 5,572,204 A 11/1996 Timm et al.
7,142,959 B2 11/2006 Oesterling et al.
(Continued)

FOREIGN PATENT DOCUMENTS

CA 2975450 A1 8/2016
CA 2909258 A1 4/2017
(Continued)

OTHER PUBLICATIONS

Kabir, Muhammad Ashad, Jun Han, and Alan Colman. "SocioTelematics: Harnessing social interaction-relationships in developing automotive applications." Pervasive and Mobile Computing 14 (2014): 129-146. (Year: 2014).*
(Continued)

*Primary Examiner* — Christopher B Seibert
(74) *Attorney, Agent, or Firm* — Polsinelli PC

(57) ABSTRACT

Systems and methods are disclosed for providing roadside service through a synchronized interactive voice response (IVR) system and graphical user interface (GUI). One method may include: receiving, based on an incoming phone call from a vehicle user device, a request for roadside service for a disabled vehicle of a vehicle user; sending a text to a phone number of the vehicle user device, wherein the text includes a link to a mobile application for roadside service requests; receiving, from the vehicle user device and via the mobile application, information associated with the request for roadside service; determining, based on a location sensor of the vehicle user device, a location of the disabled vehicle; matching a roadside service provider with the disabled vehicle based on the request for roadside service; and enabling the vehicle user to track the service status of the roadside service provider through the mobile application.

16 Claims, 8 Drawing Sheets

(51) Int. Cl.
  *G06Q 30/0601* (2023.01)
  *G06T 11/00* (2006.01)
  *G10L 15/22* (2006.01)

(52) U.S. Cl.
  CPC ..... *G06Q 30/0617* (2013.01); *G06Q 30/0631* (2013.01); *G06Q 30/0633* (2013.01); *G06Q 30/0639* (2013.01); *G06Q 30/0643* (2013.01); *G06T 11/00* (2013.01); *G10L 15/22* (2013.01); *G06T 2200/24* (2013.01); *G10L 2015/223* (2013.01)

(56) References Cited

U.S. PATENT DOCUMENTS

| | | | |
|---|---|---|---|
| 7,412,313 | B2 | 8/2008 | Isaac |
| 7,957,744 | B2 | 6/2011 | Oesterling et al. |
| 8,160,883 | B2* | 4/2012 | Lecoeuche ........ H04M 1/72445 704/235 |
| 8,417,212 | B2 | 4/2013 | Cepuran et al. |
| 8,583,320 | B2 | 11/2013 | Harris et al. |
| 8,594,616 | B2 | 11/2013 | Gusikhin et al. |
| 8,781,442 | B1 | 7/2014 | Link, II |
| 8,989,713 | B2 | 3/2015 | Doulton |
| 9,237,242 | B2 | 1/2016 | Basir |
| 9,384,491 | B1 | 7/2016 | Briggs et al. |
| 9,749,812 | B1 | 8/2017 | Dulee et al. |
| 10,192,569 | B1* | 1/2019 | Indyk ........ G10L 25/48 |
| 10,567,935 | B1* | 2/2020 | Inciong ........ H04M 1/72451 |
| 2002/0065703 | A1 | 5/2002 | Garg |
| 2003/0143976 | A1* | 7/2003 | Wang ........ H04W 12/06 455/458 |
| 2004/0198366 | A1* | 10/2004 | Crocker ........ H04W 76/19 455/455 |
| 2004/0203691 | A1* | 10/2004 | Mazzara ........ H04M 1/271 455/420 |
| 2004/0203696 | A1* | 10/2004 | Jijina ........ G01C 21/26 455/420 |
| 2004/0203730 | A1* | 10/2004 | Fraser ........ H04W 76/20 455/445 |
| 2004/0203850 | A1* | 10/2004 | Oesterling ........ G01C 21/28 455/457 |
| 2005/0070260 | A1* | 3/2005 | Mazzara, Jr. ........ G08G 1/01 455/563 |
| 2005/0254460 | A1* | 11/2005 | Fraser ........ H04W 76/20 370/328 |
| 2006/0217935 | A1* | 9/2006 | Beiermeister ........ G06F 11/0748 702/188 |
| 2006/0235688 | A1* | 10/2006 | Bicego ........ G10L 13/04 704/E15.045 |
| 2006/0276184 | A1* | 12/2006 | Tretyak ........ H04L 67/62 455/418 |
| 2007/0061069 | A1* | 3/2007 | Christensen ........ G07C 5/085 701/1 |
| 2007/0139267 | A1* | 6/2007 | Black ........ H04W 64/00 342/385 |
| 2007/0174055 | A1* | 7/2007 | Chengalvarayan ..... G10L 15/08 704/251 |
| 2007/0211880 | A1* | 9/2007 | Ross ........ H04M 11/002 379/265.01 |
| 2007/0263833 | A1* | 11/2007 | Zoeckler ........ H04L 69/40 379/221.03 |
| 2008/0004769 | A1* | 1/2008 | Lenneman ........ B60K 35/10 701/36 |
| 2009/0190735 | A1* | 7/2009 | Gilmartin ........ G10L 17/00 379/201.12 |
| 2009/0275311 | A1* | 11/2009 | Gilmartin ........ H04M 3/5166 455/414.1 |
| 2010/0057308 | A1* | 3/2010 | Hill ........ B60R 21/0132 701/1 |
| 2011/0082816 | A1 | 4/2011 | Moffett |
| 2011/0205188 | A1* | 8/2011 | Lenneman ........ B60K 35/10 345/175 |
| 2012/0219142 | A1* | 8/2012 | Gould ........ H04M 3/58 379/212.01 |
| 2013/0046592 | A1* | 2/2013 | Ross ........ G06F 3/0346 715/810 |
| 2014/0033319 | A1* | 1/2014 | Kesavan ........ G06F 21/60 726/26 |
| 2015/0081350 | A1 | 3/2015 | Truong |
| 2016/0012194 | A1* | 1/2016 | Prakash ........ G06Q 30/0601 705/2 |
| 2016/0221581 | A1* | 8/2016 | Talwar ........ G01N 29/14 |
| 2016/0288708 | A1* | 10/2016 | Chang ........ G06V 20/597 |
| 2017/0006044 | A1* | 1/2017 | Ezra ........ H04L 67/145 |
| 2017/0228709 | A1* | 8/2017 | Dhaliwal ........ G07C 5/008 |
| 2017/0232975 | A1* | 8/2017 | Burk ........ B60W 50/16 701/48 |
| 2017/0318156 | A1 | 11/2017 | Bao |
| 2018/0122377 | A1* | 5/2018 | Skantze ........ G10L 15/1822 |
| 2019/0171441 | A1* | 6/2019 | Chatterjee ........ G06F 11/3664 |
| 2020/0007926 | A1* | 1/2020 | Tang ........ H04N 21/8455 |

FOREIGN PATENT DOCUMENTS

| | | |
|---|---|---|
| CN | 101252627 B | 8/2011 |
| WO | 2010067124 A1 | 6/2010 |

OTHER PUBLICATIONS

Reimer, Bryan, et al. "The effects of a production level "voice-command" interface on driver behavior: summary findings on reported workload, physiology, visual attention, and driving performance." Assessing the demands of voice based in-vehicle interfaces (2013). (Year: 2013).*

Office Action for Canadian Application No. 3,081,939 dated Jun. 29, 2021 (7 pages).

"Audi 24-Hour Roadside Assistance | Audi Cincinnati East" Audi Cincinnati East https://www.audicincinnatieast.com/roadside-assistance.htm website visited Jun. 5, 2020, pp. 1-2.

"Roadside Assistance: Easier with the Geico Mobile App" Geico https://www.geico.com/web-and-mobile/mobile-apps/roadside-assistance/ website visited Jun. 5, 2020, 1 page.

"RoadTrust" Ckure Mobile Inc. https://roadtrust.ca/ website visited Jun. 5, 2020, pp. 1-4.

"Towbook" https://play.google.com/store/apps/details?id=com.towbook.mobile website visited Jun. 5, 2020, pp. 1-5.

"Roadside Assistance Near Me" Urgent.Ly https://www.geturgently.com/urgently-roadside-assistance-services website visited May 24, 2019, pp. 1-13.

"Roadside Assistance Simplified" Honk https://www.honkforhelp.com/ website visited May 24, 2019, pp. 1-17.

"Crossroads RSA" Crossroads India https://www.crossroadshelpline.com/industry-solutions website visited May 24, 2019, pp. 1-10.

"Skoda Assist—Roadside Assistance" Skoda https://www.skoda-auto.co.in/other-offerings/roadside-assistance website visited May 24, 2019, pp. 1-5.

"Roadside Assistance" Volkswagen India https://www.volkswagen.co.in/en/volkswagen-serivce/service-care-products/volkswagen-roadside-assistance.html website visited May 24, 2019, pp. 1-7.

"Tow & Recovery Management Software" Gazoop https://www.gazoop.com/recovery-and-towing-management-software/ website visited May 28, 2019, pp. 1-6.

"Ticketmaster connects people with events and tickets faster using Dialogflow" Dialogflow https://dialogflow.com/case-studies/ticketmaster website visited Jun. 5, 2020, pp. 1-2.

"The fastest and smartest voice assistant" SoundHound Inc. https://www.soundhound.com/hound, website visited May 28, 2019, pp. 1-6.

"Voice-assisted anything is the future of everything" Orderscape https://orderscape.com/ website visited Jun. 5, 2020, pp. 1-11.

* cited by examiner

SYNCHRONIZED INTERACTIVE VOICE RESPONSE SYSTEM AND GRAPHICAL USER INTERFACE FOR AUTOMATED ROADSIDE SERVICE

RELATED APPLICATION

This application claims priority to U.S. Provisional Application 62/855,827, filed on May 31, 2019, the entire disclosure of which is hereby incorporated herein by reference.

TECHNICAL FIELD

Aspects described herein generally relate to telecommunication and network hardware and software. In particular, the present disclosure relates to systems and methods for automated roadside service through an interactive voice response (IVR) system and graphical user interface.

BACKGROUND

Vehicles may become disabled during a trip because of a vehicle malfunction, an accident, weather-related events, etc. A disablement of a vehicle (e.g., a breakdown, malfunction, collision, etc.) can cause a stressful experience for an owner, passenger, or operator of a vehicle. The drivers and/or passengers of the disabled vehicle may contact a towing network or other roadside service provider network for assistance. Service companies may rely on digital tools, such as websites or mobile applications, to reduce labor and other costs. However, in times of distress, drivers and passengers may be more inclined to seek help over the phone rather than over a website or mobile application. Yet, service companies also increasingly rely on interactive voice response (IVR) systems for interactions with callers. This reliance can often lead to user dissatisfaction due to a perception that a user's needs or concerns are not being met.

There is therefore a desire for a reliable system and method for providing roadside service that is efficient and operationally cost-effective, but which also assures distressed drivers and/or passengers that their concerns and needs are being met.

The present disclosure may address one or more of the shortcomings described above.

BRIEF SUMMARY

The following summary presents a simplified summary of certain features. The summary is not an extensive overview and is not intended to identify key or critical elements.

Systems, apparatuses, and methods for automated roadside service through a synchronized interactive voice response (IVR) system and graphical user interface (GUI) are described herein. The system may include one or more servers, network computing devices, and computing devices associated with user vehicles and service vehicles. The system may receive requests for a roadside service from a caller (e.g., an oral and/or voice request via a telephone call from a driver or passenger of a disabled vehicle), direct the caller to a mobile application with a graphical user interface on the caller's mobile device (e.g., via a text having a universal resource locator (URL) to access the mobile application), prompt and receive further input concerning information associated with the requested roadside assistance services, and/or manage the dispatch of roadside assistance providers to the disabled vehicle. In some aspects, the prompting and receiving further input may be performed via the graphical user interface while simultaneously interacting with the caller via voice communication over the telephone (e.g., via the interactive voice response system).

At least one example method may include a computing device having one or more processors receiving, via an interactive voice response system (IVR), an indication of a voice request (e.g., a request communicated orally over the telephone) generated by a first device for a roadside service for a vehicle that has undergone a vehicle incident. The vehicle and the first device may be associated with a user (e.g., a vehicle user), and the indication of the voice request may identify the first device (e.g., to establish communication with the first device). The computing device may send, based on the indication of the voice request, an electronic message (e.g., a text message or SMS message) to the first device. The electronic message may prompt the user to access a roadside assistance application (e.g., via a URL or link). The computing device may receive, via the roadside assistance application, a plurality of parameters associated with the vehicle incident. The computing device may determine, via the first device, a location of one or both of the first device or the vehicle (e.g., via a global positioning system (GPS) of the first device and/or a telematics device associated with the vehicle). The computing device may identify, based on the determined location, and based on the plurality of parameters associated with the vehicle incident, a list of service providers to provide the requested roadside service. The computing device may receive, via the roadside assistance application, a selection of a service provider from the list of service providers. The computing device may establish communications with a second device associated with the selected service provider to monitor service status of the service provider. The computing device may cause a display, via the roadside assistance application, of the service status of the service provider (e.g., on the first device associated with the user). Furthermore, the computing device may receive an indication of the service provider completing the roadside service.

In accordance with other embodiments of the present disclosure, an example system comprises one or more processors; and a memory storing computer-executable instructions. When the computer-executable instructions are executed by the one or more processors, the processors may cause the system to perform one or more methods described herein.

In accordance with other embodiments of the present disclosure, one or more non-transitory computer readable media stores computer-executable instructions. When these computer-executable instructions are executed by a computing device, the computing device may perform one or more of the methods described herein.

These and other features and advantages are described in greater detail below. The methods and systems of the above-referenced embodiments may also include other additional elements, steps, computer-executable instructions, or computer-readable data structures. In this regard, other embodiments are disclosed and claimed herein as well. The details of these and other embodiments are set forth in the accompanying drawings and the description below. Other features and advantages will be apparent from the description, drawings, and claims.

BRIEF DESCRIPTION OF THE DRAWINGS

A more complete understanding of the present invention and the advantages thereof may be acquired by referring to the following description in consideration of the accompanying drawing, in which like reference numbers indicate like features, and wherein.

DETAILED DESCRIPTION

Figure 1:
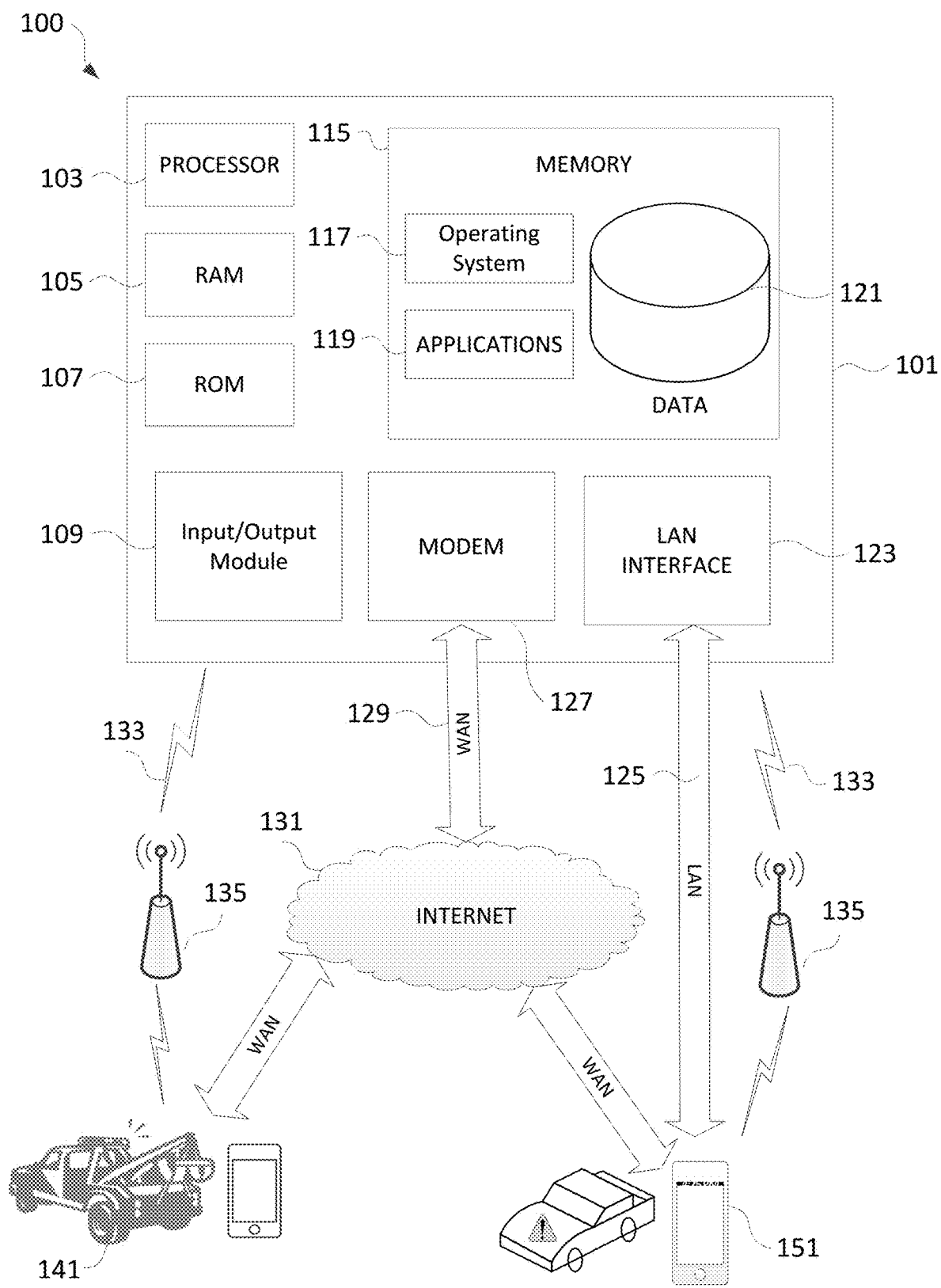
FIG. 1 shows one example operating environment in which one or more aspects described herein may be implemented.

The accompanying drawings, which form a part hereof, show examples of the disclosure. It is to be understood that the examples shown in the drawings and/or discussed herein are non-exclusive and that there are other examples of how the disclosure may be practiced.

FIG. 1 shows a block diagram of one example roadside assistance computing device (or system) 101 in a computer system 100 that may be used according to one or more illustrative embodiments of the disclosure. The roadside assistance computing device 101 may have a processor 103 for controlling overall operation of the device 101 and its associated components, including RAM 105, ROM 107, input/output module 109, and memory 115. The roadside assistance computing device 101, along with one or more additional devices (e.g., one or more computing devices of a driver of a roadside service provider ("roadside service provider user device") 141, one or more computing devices of a passenger or a driver of a disabled vehicle (e.g., "vehicle user device" 151) may correspond to any of multiple systems or devices described herein, such as personal mobile devices, vehicle-based computing devices, roadside assistance provider servers, roadside assistance servers, call centers, internal data sources, external data sources and other various devices in a roadside assistance system. These various computing systems may be configured individually or in combination, as described herein, for receiving signals and/or transmissions from one or more computing devices, the signals or transmissions including data related to location of a vehicle, operating parameters of a vehicle, operating parameters of vehicle in a same or similar location to the vehicle, and the like. The various computing systems may be further configured individually or in combination, as described herein, for processing the signals or transmissions to determine a location of the vehicle, a cause of an issue associated with the vehicle, and the like, using the devices of the roadside assistance systems described herein. In addition to the features described above, the techniques described herein also may be used for generating and displaying one or more different types of notifications, transmitting a request for assistance to a service center computing device, and the like. The various computing systems may be further configured individually or in combination, as described herein, for communicating with a vehicle user to access a mobile application user interface, determine an appropriate roadside service provider from a list of roadside service providers, and manage the dispatch of the roadside service provider to rescue or service the disabled vehicle.

Input/Output (I/O) 109 may include a microphone, keypad, touch screen, and/or stylus through which a user of the roadside assistance computing device 101 may provide input, and may also include one or more of a speaker for providing audio output and a video display device for providing textual, audiovisual and/or graphical output. Software may be stored within memory 115 and/or storage to provide instructions to processor 103 for enabling device 101 to perform various actions. For example, memory 115 may store software used by the device 101, such as an operating system 117, application programs 119, and an associated internal database 121. The various hardware memory units in memory 115 may include volatile and nonvolatile, removable and non-removable media implemented in any method or technology for storage of information such as computer-readable instructions, data structures, program modules or other data. Certain devices and systems within roadside assistance systems may have minimum hardware requirements in order to support sufficient storage capacity, processing capacity, analysis capacity, network communication, etc. For instance, in some embodiments, one or more nonvolatile hardware memory units having a minimum size (e.g., at least 1 gigabyte (GB), 2 GB, 5 GB, etc.), and/or one or more volatile hardware memory units having a minimum size (e.g., 256 megabytes (MB), 512 MB, 1 GB, etc.) may be used in a device 101 (e.g., a personal mobile device 101, vehicle-based device 101, roadside assistance server 101, etc.), in order to receive and analyze the signals, transmissions, etc. including location information, vehicle operating information, and the like, determine a location of the vehicle, determine a cause of an issue associated with the vehicle, generate and transmit notifications, and the like, using the various devices of the roadside assistance systems. Memory 115 also may include one or more physical persistent memory devices and/or one or more non-persistent memory devices. Memory 115 may include, but is not limited to, random access memory (RAM) 105, read only memory (ROM) 107, electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by processor 103.

Processor 103 may include a single central processing unit (CPU), which may be a single-core or multi-core processor (e.g., dual-core, quad-core, etc.), or may include multiple CPUs. Processor(s) 103 may have various bit sizes (e.g., 16-bit, 32-bit, 64-bit, 96-bit, 128-bit, etc.) and various processor speeds (ranging from 100 MHz to 5 Ghz or faster). Processor(s) 103 and its associated components may allow the system 101 to execute a series of computer-readable instructions, for example, receive signals or transmissions including location information, vehicle operation information, and the like, to determine a location of the vehicle, determine a cause of an issue associated with the vehicle, control amount and type of data received, establish connections with the user device associated with a user of a disabled vehicle (e.g., vehicle user device), transmitting a text message to the vehicle user device to direct the user of the disabled vehicle to access a mobile application, facilitate exchange of information with the vehicle user device via the mobile application, secure a roadside service provider for the disable vehicle, report dispatch of the roadside service provider over the mobile application, and the like.

The computing device (e.g., a server, a call center computing device, a personal mobile device, a roadside server provider user device, a vehicle user device, etc.) may operate in a networked environment 100 supporting connections to one or more remote computers, such as terminals 141 and 151. Such terminals may be personal computers or servers 141 (e.g., home computers, laptops, web servers, database servers), mobile communication devices 151 (e.g., mobile phones, tablet computers, etc.), vehicle-based computing systems 161 (e.g., on-board vehicle systems, telematics devices, mobile phones or other personal mobile devices within vehicles), and the like, each of which may include some or all of the elements described above with respect to the road segment evaluation computing device 101. The network connections depicted in FIG. 1 include a local area network (LAN) 125 and a wide area network (WAN) 129, and a wireless telecommunications network 133, but may also include other networks. When used in a LAN networking environment, the computing device 101 may be connected to the LAN 125 through a network interface or adapter 123. When used in a WAN networking environment, the device 101 may include a modem 127 or other means for establishing communications over the WAN 129, such as network 131 (e.g., the Internet). When used in a wireless telecommunications network 133, the device 101 may include one or more transceivers, digital signal processors, and additional circuitry and software for communicating with wireless computing devices 151 and 161 (e.g., mobile phones, portable customer computing devices, vehicle-based computing devices and systems, etc.) via one or more network devices 135 (e.g., base transceiver stations) in the wireless network 133.

As discussed below, the data transferred to and from various devices in a roadside assistance system 100 may include secure and sensitive data, such as confidential vehicle operation data, mobile phone identification data, mobile phone location data, insurance policy data, and confidential user data from drivers and passengers in vehicles. Therefore, it may be desirable to protect transmissions of such data by using secure network protocols and encryption, and also to protect the integrity of the data when stored on the various devices within a system, such as personal mobile devices, vehicle-based devices, vehicle user devices, roadside service provider user devices and servers, external data source servers, or other computing devices in the system 100. For example, one or more devices (e.g., roadside assistance server 101) may use a security and integration layer to authenticate users and restrict access to unknown or unauthorized users. In various implementations, such a security and integration layer may provide, for example, a file-based integration scheme or a service-based integration scheme for transmitting data between the various devices in an electronic display system. Data may be transmitted through the security and integration layer, using various network communication protocols. Secure data transmission protocols and/or encryption may be used in file transfers to protect the integrity of the data, for example, File Transfer Protocol (FTP), Secure File Transfer Protocol (SFTP), and/or Pretty Good Privacy (PGP) encryption. In other examples, one or more web services may be implemented within the various devices 101 in the system 100 and/or the security and integration layer 160. The web services may be accessed by authorized external devices and users to support input, extraction, and manipulation of the data (e.g., vehicle data, driver data, vehicle user device data, location data, roadside service provider user device data, roadside assistance issue data, etc.) between the various devices 101 in the system 100. Web services built to support a personalized display system may be cross-domain and/or cross-platform, and may be built for enterprise use. Such web services may be developed in accordance with various web service standards, such as the Web Service Interoperability (WS-I) guidelines. In some examples, a driver data, vehicle data, location data, roadside assistance issue data and/or roadside assistance data analysis web service, or the like, may be implemented in the security and integration layer 160 using the Secure Sockets Layer (SSL) or Transport Layer Security (TLS) protocol to provide secure connections between servers 101 and various clients 141, 151, and 161. SSL or TLS may use HTTP or HTTPS to provide authentication and confidentiality. In other examples, such web services may be implemented using the WS-Security standard, which provides for secure SOAP messages using XML encryption. In still other examples, the security and integration layer 160 may include specialized hardware for providing secure web services. For example, secure network appliances in the security and integration layer 160 may include built-in features such as hardware-accelerated SSL and HTTPS, WS-Security, and firewalls. Such specialized hardware may be installed and configured in the security and integration layer 160 in front of the web servers, so that any external devices may communicate directly with the specialized hardware.

Although not shown in FIG. 1, various elements within memory 115 or other components in system 100, may include one or more caches, for example, CPU caches used by the processing unit 103, page caches used by the operating system 117, disk caches of a hard drive, and/or database caches used to cache content from database 121. For embodiments including a CPU cache, the CPU cache may be used by one or more processors in the processing unit 103 to reduce memory latency and access time. In such examples, a processor 103 may retrieve data from or write data to the CPU cache rather than reading/writing to memory 115, which may improve the speed of these operations. In some examples, a database cache may be created in which certain data from a database 121 (e.g., a database of registered or subscribed vehicle users and their contact information, database of vehicles, database of vehicle location information, database of roadside service providers, database of vehicle service locations, database of roadside assistance issue information, etc.) is cached in a separate smaller database on an application server separate from the database server. For instance, in a multi-tiered application, a database cache on an application server can reduce data retrieval and data manipulation time by not needing to communicate over a network with a back-end database server. These types of caches and others may be included in various embodiments, and may provide potential advantages in certain implementations of roadside assistance systems, such as faster response times and less dependence on network conditions when transmitting and receiving driver information, vehicle information, location information, roadside assistance issue information, and the like.

It will be appreciated that the network connections shown are illustrative and other means of establishing a communications link between the computers may be used. The existence of any of various network protocols such as TCP/IP, Ethernet, FTP, HTTP and the like, and of various wireless communication technologies such as GSM, CDMA, WiFi, and WiMAX, is presumed, and the various computing devices in roadside assistance system components described herein may be configured to communicate using any of these network protocols or technologies.

Additionally, one or more application programs 119 may be used by the various computing devices 101 within a roadside assistance system 100. One or more of the computing devices (e.g., vehicle user device 151) may be prompted to access a mobile application of an application program 119 hosted or facilitated by computing device. The application program 119 may include computer executable instructions for receiving and analyzing various signals or transmissions including location information of a disabled vehicle or vehicle user device 151, information associated with a request for roadside service, vehicle operating data, desired roadside service location or provider, service status updates for a dispatched roadside service, and the like.

Figure 2:
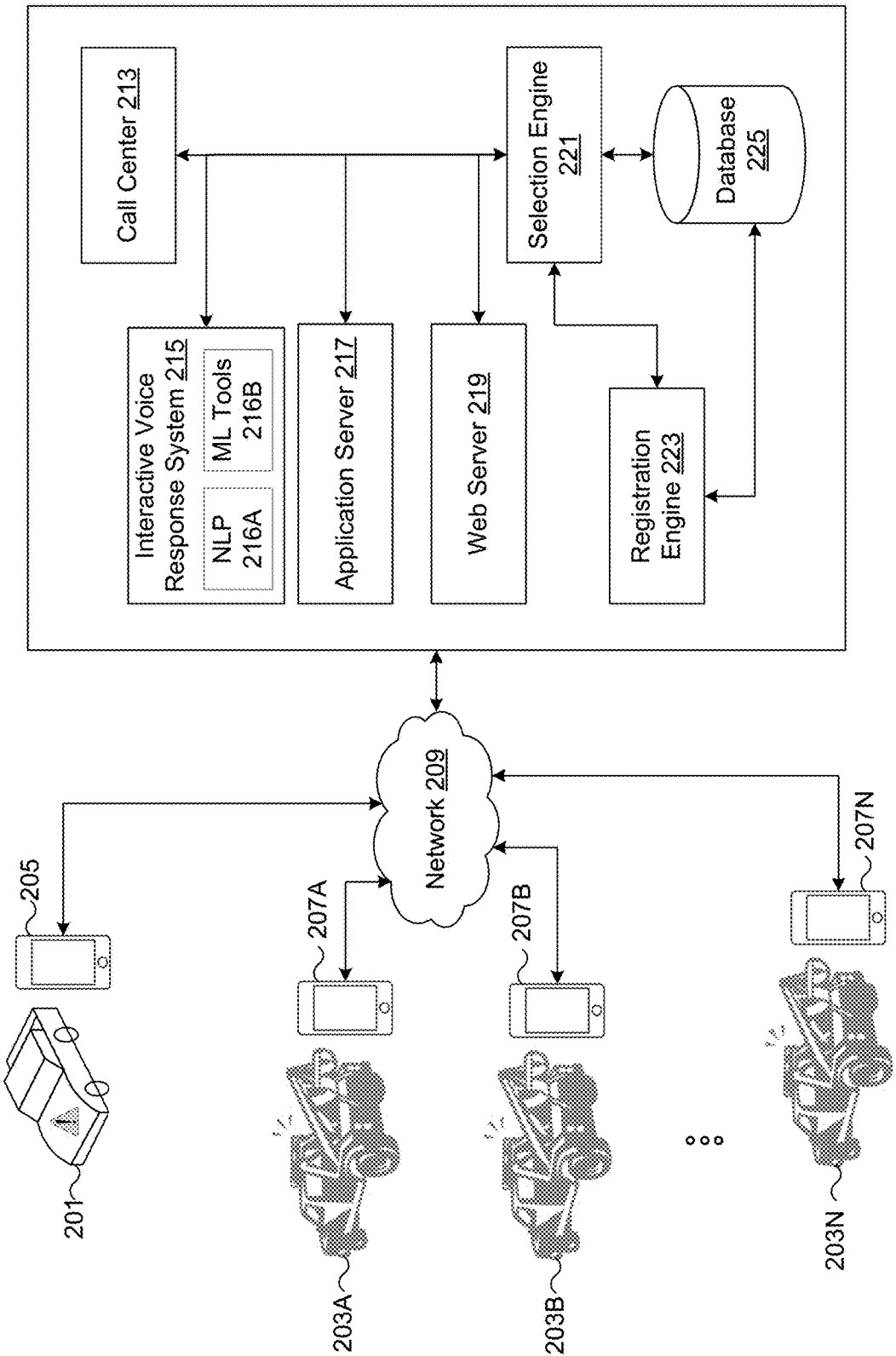
FIG. 2 is a schematic diagram showing an example system for providing roadside service according to one or more aspects described herein.

FIG. 2 is a schematic diagram showing an example system for providing roadside assistance services. The system may comprise one or more vehicles that are disabled or for which a driver or passenger of the vehicle is seeking roadside service (e.g., "disabled vehicle" or "vehicle user device" 201), one or more service vehicles (e.g., service vehicles 203A-203N), one or more user computing devices of the disabled vehicle's driver or passenger (e.g., vehicle user device 205), one or more computing devices associated with the service provider (e.g., service provider user devices 207A-207N), one or more networks (e.g., network 209), and one or more roadside assistance units (e.g., roadside assistance unit 211). The roadside assistance unit may be based on or implemented using device 101 of FIG. 1.

The disabled vehicle 201 is shown as a car, but the disabled vehicle 201 may comprise any type of vehicle, such as a motorcycle, bicycle, scooter, drone (or other automated device), truck, bus, boat, plane, recreational vehicle, helicopter, etc. While only one disabled vehicle 201 is shown, the system may include multiple disabled vehicles. A service vehicle of the service vehicles 203A-203N is shown as a tow truck, but the service vehicle may comprise a different type of truck or any other type of vehicle, such as a motorcycle, car, van, bicycle, scooter, drone (or other automated device), bus, boat, plane, helicopter, etc.

The vehicle user device 205 or the service provider user devices 207A-207N may comprise, for example, a cell phone, smartphone, tablet (e.g., with cellular transceivers), laptop (e.g., communicatively coupled to cellular transceivers), wearable devices (e.g., smart watches, electronic eyeglasses, etc.), or other types of computing devices configured to communicate with the network 209. The vehicle user device 205 may be associated with the disabled vehicle 201, and the service provider user devices 207A-207N may be respectively associated with the service vehicles 203A-203N. The vehicle user device 205 and the service provider user devices 207A-207N may communicate with the network 209 and/or the roadside assistance unit 211.

The vehicle user device 205 may be associated with a driver or passenger of the disabled vehicle 201. The service provider user devices 207A-207N may be respectively associated with a driver or passenger of the service vehicles 203A-203N. The vehicle user device 205 or the service provider user devices 207A-207N may be otherwise embedded respectively in the disabled vehicle 201 or service vehicles 203A-203N. The vehicle user device 205 and the service provider computing devices 207A-207N may be configured in a similar manner as the terminals 151 and 141 of FIG. 1.

In some aspects, the disabled vehicle 201 and/or the service vehicles 203A-203N may comprise telematics devices associated with the respective vehicles. The telematics device may comprise an in-built computing system having one or more processors, and an interface for communications with other computing devices (e.g., vehicle user device 205, service provider user devices 207A-207N, roadside assistance unit 211, etc.). Furthermore, the telematics device may allow the vehicle (e.g., a disabled vehicle 201 and/or a service vehicle 203A-203N) to communicate or receive data from one or more sensors within the respective vehicle. The sensors within the respective vehicle may be used to detect damage, disablements, or other cause for a roadside service. Furthermore, sensors within the respective vehicle may be used to obtain crash data or location data (e.g., via a global positioning system (GPS) within the respective vehicle).

The network 209 may be a single network or a collection of multiple connected networks. The network 209 may include one or more of any of various types of information distribution networks, such as a satellite network, a telephone network, a cellular network, a Wi-Fi network, an Ethernet network, an optical fiber network, a coaxial cable network, a hybrid fiber coax network, etc. The network 209 may be a local area network (LAN), a wide area network (WAN), etc. The network 209 may be an Internet Protocol (IP) based network (e.g., the Internet). The network 209 may use a plurality of interconnected communication links to connect the user computing device 205, the service provider computing devices 207A-207N, and the roadside assistance unit 211. As will be described below, the roadside assistance unit 211 may communicate with the user of the disabled vehicle via the vehicle user device over a telephone connection while simultaneously facilitating the exchange of information through a mobile application on the vehicle user device.

The roadside assistance unit 211 may comprise processes implemented on, for example, the roadside assistance computing device 101 or other types of computing devices. The roadside assistance unit 211 may comprise one or more call centers (e.g., call center 213), one or more interactive voice response systems (e.g., interactive voice response system 215), one or more application servers (e.g., application server 217), one or more web servers (e.g., web server 219), one or more selection engines (e.g., selection engine 221), one or more registration engines (e.g., registration engine 223), and one or more databases (e.g., database 225). The components of the roadside assistance unit 211 may be implemented on one or more computing devices.

The roadside assistance unit 211 may be configured to facilitate rendering roadside assistance services to users. The roadside assistance services may comprise, for example, towing, lockouts, fuel delivery, tire change, jump-starts, or other types of services. One or more service providers may provide the roadside services to users. A service provider may be, for example, an individual entity, an individual person, or an organization. A service provider may be associated with a service vehicle (e.g., a service vehicle of the service vehicles 203A-203N), and may be associated with a service provider user device (e.g., a service provider user device of the service provider user devices 207A-207N).

The service providers may be registered with the roadside assistance unit 211 (e.g., using the registration engine 223). The registration engine 223 may be configured to register new service providers to the roadside assistance unit 211, and/or may be configured to manage registered service providers. Furthermore, the registration engine 223 may also be used to register or subscribe vehicle users so that the vehicle users would be able to use or take advantage of the systems and methods presented herein for roadside assistance service. Identifying information of the vehicle users (e.g., name, driver identification, contact information, mobile phone numbers, etc.) or their user devices may be stored in database 225.

Users may send requests for roadside assistance services to the roadside assistance unit 211. For example, a user associated with the disabled vehicle 201 and the disabled user device 205 may encounter a vehicle malfunction and/or accident. Due to a stressful experience faced by a driver or passenger of a vehicle when the vehicle becomes disabled or otherwise requires roadside assistance, it is contemplated that the driver or passenger of the vehicle (e.g., user of the disabled vehicle) would be inclined to make a telephone call (e.g., via vehicle user device 205) for roadside assistance. The call may be directed or diverted to call center 213 of roadside assistance unit 211. The call center 213 may be, for example, an office used for receiving or sending requests by telephone. An agent of the call center 213 may receive and process the user's request for the roadside assistance service. Additionally or alternatively, the user may make a phone call to the interactive voice response system 215. The interactive voice response system 215 may comprise, for example, processes implemented on computing devices that are configured to interact with humans through the use of voice generation and/or speech recognition. The interactive voice response system 215 may recognize and process the user's request for the roadside assistance service. For example, the interactive voice response system 215 may comprise a natural language processor (NLP) 216A and machine learning (ML) tools 216B. NLP 216A may include various processors, libraries, and AI-based systems (e.g., machine learning (ML) tools 216B) to analyze and convert natural language to identifiable computer-executable language (e.g., parameters describing a vehicle incident, vehicle identification information, user information, etc.) that could result in a computing system to perform substantive functions. The NLP system 216A may be guided by the ML tools 216B, which may perform and/or utilize supervised and unsupervised learning from natural language data. The NLP system 216A may support tasks, such as tokenization, sentence segmentation, part-of-speech tagging, named entity extraction, chunking, parsing, and co-reference resolution. These tasks may be needed to build more advanced text processing services.

After the user of the disabled vehicle requests a roadside assistance service, the roadside assistance unit 211 may authenticate the user of the disabled vehicle. For example, the registration engine of the roadside assistance unit 211 may identify the user of the disabled vehicle based on any identifying details provided over the phone communication or based on a mobile phone identification. The identifying details or mobile phone identification may be compared to stored information of registered or subscribed users of the roadside assistance provided by the systems and methods described herein.

After the user of the disabled vehicle has been authenticated, the roadside assistance unit 211 may ask or direct the user of the disabled vehicle to access a mobile application and/or website to process the request for roadside assistance. For example, the roadside assistance unit 211 may deliver a text message with a uniform resource locator (URL) link to the mobile application or website. In some aspects, the roadside assistance unit 211 may initially ask for permission to send the text. Through the mobile application or website, the roadside assistance unit 211 can receive information associated with the requested roadside service, locate the disabled vehicle, identify a registered service provider, dispatch the service provider to provide the requested roadside assistance service to the disabled vehicle, and enable the user of the disabled vehicle to receive service status updates. Information related to the registered service providers (and/or other service providers) may be stored in the database 225. The database 225 may comprise any type of storage system, such as an ORACLE Database, MySQL, MICROSOFT SQL Server, IBM DB2, etc.

The mobile application may be hosted or managed by the application server 217. The website may be hosted or managed by the webserver 219. Through the mobile application or website, the user of the disabled vehicle may send, via the user computing device 205 and the network 209 and to the roadside assistance unit 211, a request for a roadside assistance service to resolve the malfunction and/or accident situation.

For example, the user may enter the roadside assistance service request into an application running on the user computing device 205. The request may be sent to the application server 217. The application server 217 may comprise, for example, processes implemented on computing devices that are configured to communicate and/or interact with the application running on the user computing device 205. The application server 217 may receive and process the user's roadside assistance service request. Additionally or alternatively, the user may enter the roadside assistance service request into a web browser (or other types of user interfaces) running on the user computing device 205. The request may be sent to the web server 219, which may be configured to receive and process the request. The user may send the roadside assistance service request via other types of user interfaces and/or other types of media, and the roadside assistance unit 211 may comprise other types of corresponding processes for receiving and processing the user's request.

After receiving the user's service request, the selection engine 221 may be configured to select (e.g., in real time) one or more registered service providers based on various factors, for example, in order to select an optimal service provider to render the roadside assistance service to the user. The roadside assistance unit 211 may subsequently dispatch the service provider to the location of the disabled vehicle to handle the malfunction and/or accident situation. In some aspects, the roadside assistance unit 211 may prompt the user of the disabled vehicle to input further information to best assist the user of the disabled vehicle in the roadside service. For example, if the user of the disabled vehicle requests a towing of the disabled vehicle, the roadside assistance unit 211 may present the user of the disable vehicle with choices for a towing destination, e.g., on the mobile application or website. The choices may be listed (e.g., by proximity, ratings, alphabetical order, cost, etc.) or presented on a map. The user of the disabled vehicle may submit the desired towing destination.

While the user of the disabled vehicle is receiving and sending the above-described information on the mobile application or website, the roadside assistance unit 211 may be simultaneously engaged in voice communication (e.g., an automated and/or spontaneous, natural language voice communication over a telephone) with the user of the disabled vehicle via the vehicle user device. The simultaneous engagement of telephone service and graphical user interface may help alleviate the anxiety of a distressed caller after the disablement or malfunction of a vehicle.

Figure 3:
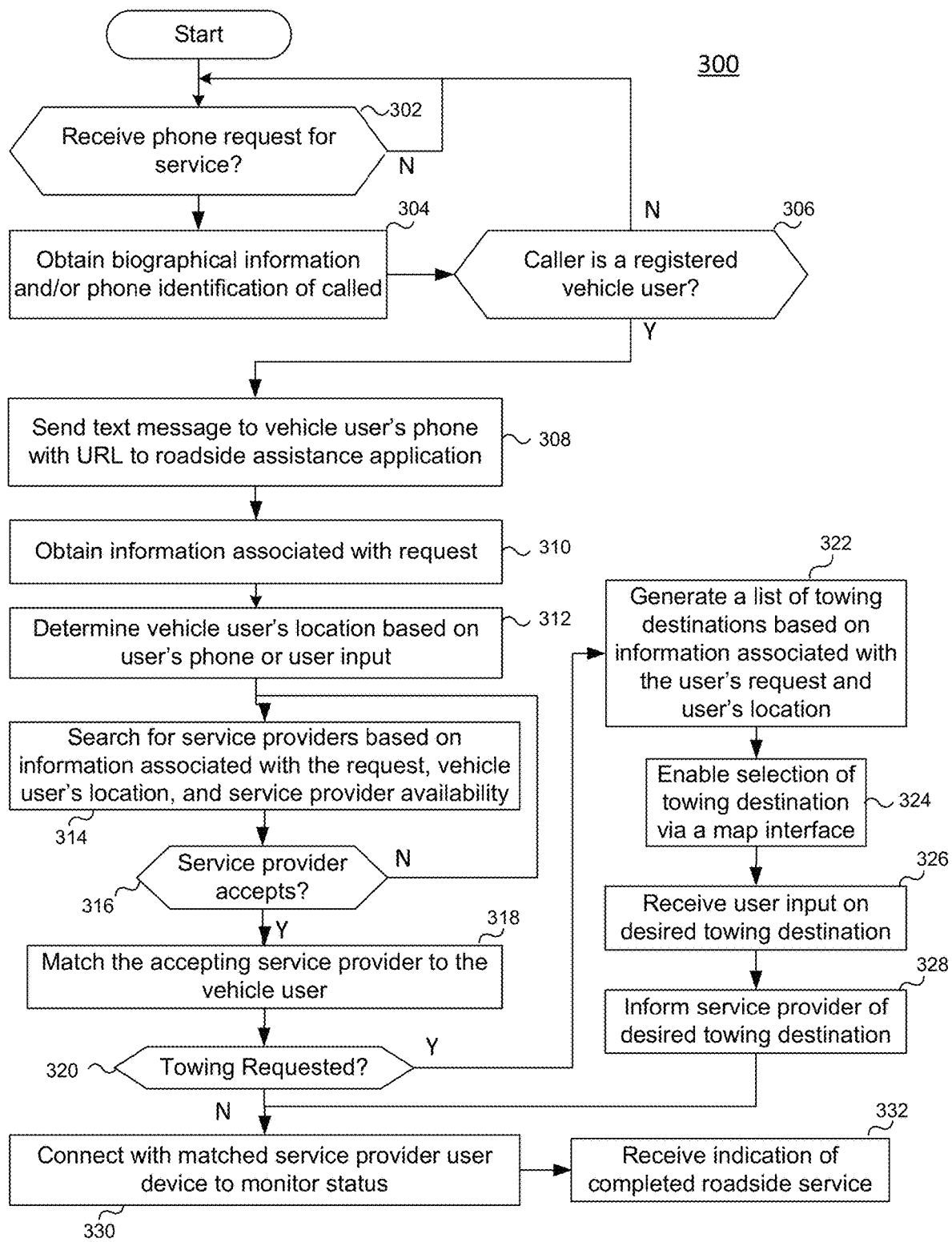
FIG. 3 illustrates an example flow diagram that may be used to implement aspects of the disclosure.

FIG. 3 illustrates an example flow diagram of method 300 that may be used to implement aspects of the disclosure. One or more steps of method 300 may be performed by one or more components of computing device 101 or roadside assistance unit 211.

At step 302, the roadside assistance unit 211 or computing device 101 (hereinafter, individually or in combination referred to as the "system") may determine whether it has received a phone request for a roadside service for a disabled or malfunctioning vehicle. For example, a live agent at call center 213 may indicate that a call has been received for a request for roadside service. Also or alternatively, an interactive voice response system may automatically register an incoming call as one concerning a request for a roadside service, e.g., based on a keypad input or voice recognition. If no request for roadside service has been received, the system may continue to monitor incoming calls for a request for a roadside service.

After the system detects that a phone call has been received for a request for a roadside service, the system may obtain biographical information and/or phone identification information of the caller (e.g., as in step 304). Subsequently, the system may authenticate the caller, e.g., to determine whether the caller is qualified to use the systems and methods presented herein for roadside assistance. The authentication process may involve determining whether the caller is a vehicle user that is registered in the system (e.g., as in step 306). For example, a roadside assistance unit 211 may check to see if the biographical information and/or phone information matches any information stored in database 225. If the authentication is unsuccessful, the caller may not necessarily be provided with the full extent of benefits of the various embodiments of the present disclosure, depending on how these embodiments are utilized.

After the user has been authenticated, the authenticated user (hereinafter referred to as "vehicle user") may be asked or prompted to continue the roadside service request over a mobile application or website while simultaneously being engaged in voice communication with the live agent or interactive voice response system. In at least one aspect, the system (e.g., call center 213) may send a text message to the vehicle user's phone (e.g., vehicle user device 151) with a URL or other link to access a roadside assistance mobile application or website (e.g., as in step 308).

In some aspects, the user would need to first consent to receiving the text. In further aspects, the system performing these steps would first determine the carrier of the user's mobile device, and then determine whether the carrier allows for simultaneous use of phone service and mobile data.

The mobile application or website may be hosted or managed by the system. After receiving the text on the vehicle user's phone (e.g., vehicle user device), the vehicle user may use the URL or link to open or access the mobile application or website.

At step 310, the system may obtain information associated with the request. For example, the mobile application or website may prompt the user to enter information such as the type of roadside service being requested (e.g., towing, lockout, fuel delivery, tire change, jumpstart, etc.). The received information associated with the request may be processed (e.g., by NLP 216A) to determine one or more parameters for the vehicle incident. The one or more parameters may include, for example, the cause of a vehicle's breakdown, malfunction, or disablement, an identification of the disabled vehicle, etc. For example, the system may recognize, from registration information of the vehicle user saved in its database, that the vehicle user owns more than one vehicle. The user may thus be prompted to identify the vehicle that needs the roadside assistance.

In some aspects, the system may also or alternatively establish communications with a telematics device of the disabled vehicle to obtain further parameters for the vehicle incident (e.g., severity of damage, area of damage). For example, after the user of the disabled vehicle has indicated that the disabled vehicle had a brake failure, the system may receive data from brake sensors within the disabled vehicle to determine the severity of the brake failure.

At step 312, the system may determine the vehicle user's location. For example, the system may receive, via a GPS sensor of the vehicle user's mobile device, a location of the vehicle user's mobile device. This location may be used to assume, or prompt the vehicle user to confirm as, the location of the disabled vehicle. In some aspects, the vehicle user may communicate the location of the disabled vehicle over the telephone to the call center, e.g., while the vehicle user is simultaneously using the mobile application or website.

At step 314, the system may search for service providers based on the received information associated with the request for roadside service, the vehicle user's location, and the service provider's availability. For example, the system may maintain a registry of service providers in its database 225. Of these service providers, the system may generate a list of service providers who are within a predetermined proximity to, or within geographic region that includes, the user's location. Then the system may identify, from a list of service providers, a set of service providers who provide the service that is requested by the user. The system may further determine, from the set of service providers, a subset of service providers who are available. It is contemplated that the subset could be further refined based on additional preferences or constraints set by the vehicle user, e.g., cost, service provider ratings, etc.

The system may then ping the service providers of this subset to determine if any one of them would accept the vehicle user's request for a roadside service. The system may then wait for a predetermined time to determine whether a service provider of this subset accepts the request (e.g., as in step 316).

After a service provider has accepted the vehicle user's request, the system can match the accepting service provider to the vehicle user (e.g., as in step 318). For example, the system may provide the service provider information associated with the request, and a way to contact the vehicle user (e.g., via a phone number of the vehicle user device). The vehicle user may be informed that a service provider has been matched through the graphical user interface (GUI) of the mobile application or website. Since the vehicle user may be simultaneously engaged in voice communication through the call center, an interactive voice response system (IVR) may automatically indicate to the user that the service provider has been matched. Also or alternatively, a live agent of the call center may indicate the matching.

It is contemplated that for some requests for roadside service, the system may need additional information from the vehicle user. The simultaneous and synchronized engagement of the vehicle user via voice communication (e.g., via an interactive voice response system) and via a graphical user interface of the mobile application or website may facilitate the exchange of this information. Thus, instead of relying solely on a voice communication (e.g., during a telephone call) with a live agent or interactive voice response system, or solely on a digital communication via a graphical user interface, the system synchronizes the above two methods for a seamless exchange of information that could enhance the distressed vehicle user's experience.

For example, if the system has determined that the requested roadside service is for towing (e.g., step 320=Y), the system may generate a list of towing destinations (e.g., as in step 322). The list may be generated, for example, based on information associated with the vehicle user's request and the vehicle user's location, or other user preferences or constraints (e.g., costs, ratings, etc.). The generated list may be presented on a user interface of the mobile application or website for the vehicle user to select a desired towing destination. Also or alternatively, towing destinations from the list may be presented on an interactive map on a graphical user interface of the mobile application or website. Thus, the system may enable the selection of the towing destination through the map (e.g., as in step 324).

After the vehicle user selects a desired towing destination (e.g., from the generated list or map), the system may receive the user selection of the desired towing destination (e.g., as in step 326.). The matched service provider (e.g., from 318) may be informed or notified of the vehicle user's desired towing destination (e.g., as in step 328). This may allow the service provider to tow the vehicle user's disabled vehicle to the towing destination.

After a service provider has been matched, the system may establish connections with the matched service provider's user device to monitor the service status of the service provider (e.g., as in step 330). For example, the service provider could be tracked via a GPS or location sensor of the service provider's user device. The system could provide service status updates to the vehicle user based on the monitoring of the service provider. The service status updates may be sent, for example, via text messages from the call center, and/or may be shown to the vehicle user on the graphical user interface of the mobile application or website. For example, the graphical user interface may have an option to "track rescue status." Service Status updates may include for example, "we're finding a service provider nearby," "rescuer is on the way," "rescuer is arriving soon," "your vehicle has been dropped off" (e.g., for vehicle users requesting towing of the disabled vehicle to another location), and "your rescue has been completed." In some aspects, the system may enable the user to share the rescue service status with family or friends electronically via the mobile application or website. For example, the mobile application may allow the vehicle user to send the service status updates to a contact stored in the vehicle user device.

At step 332, the system may receive an indication that the roadside service has been completed. The indication may be sent by the vehicle user or the service provider via their respective user device.

FIGS. 4-8 illustrate example user interfaces that implement aspects of the disclosure. Each user interface may be used or may be accessible via a user device (e.g., the vehicle user device 151 and 205) of a user (e.g., user of the disabled vehicle), as the user device executes a mobile application and/or website for implementing aspects of the disclosure herein. The mobile application and/or website may be referred to as "roadside assistance application" for simplicity. The roadside assistance application may be managed, facilitated, hosted, or otherwise interfaced with the roadside assistance unit 211 (e.g., via application server 217 and/or web server 219).

Figure 4:
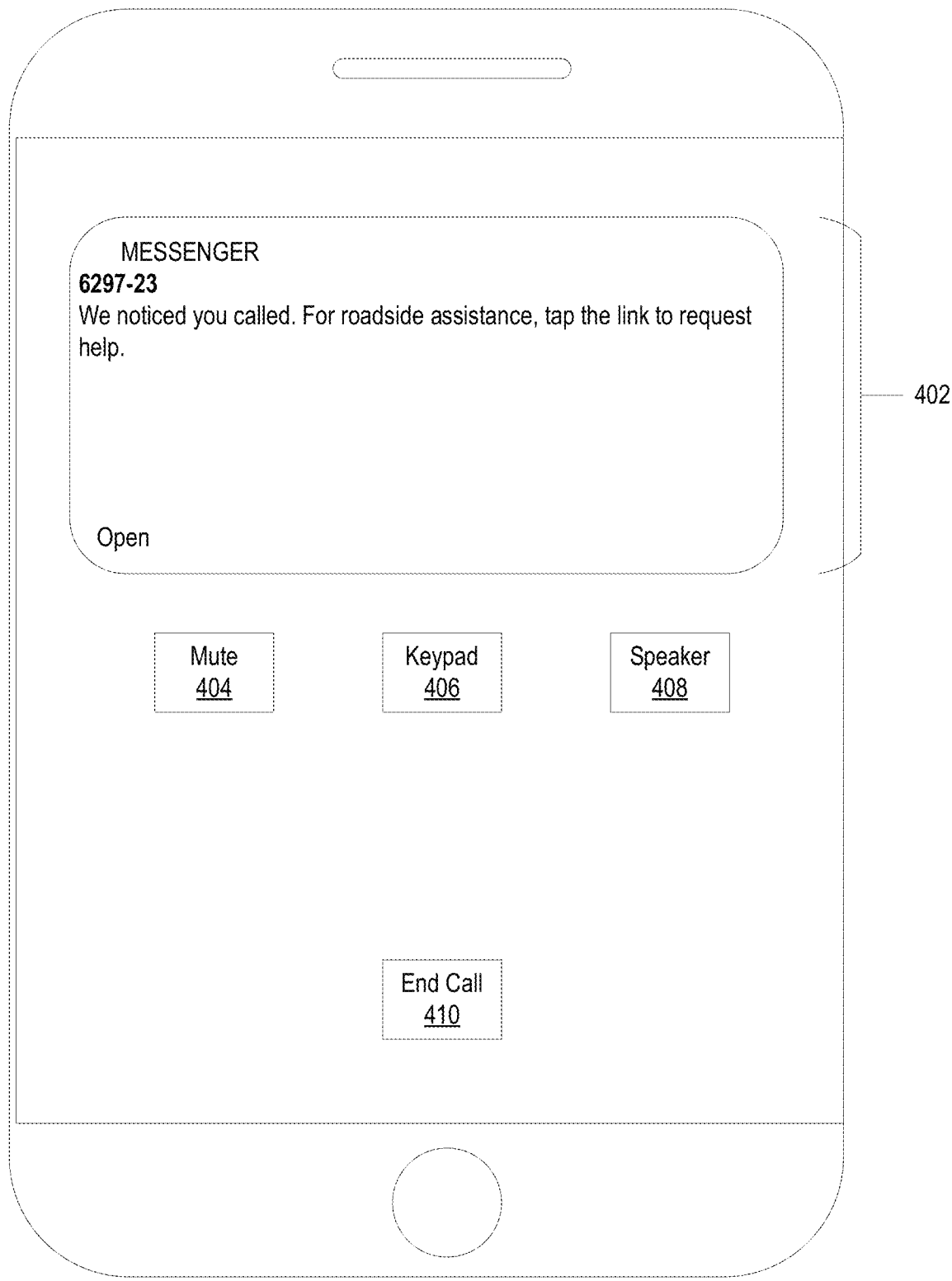
FIGS. 4-8 illustrate example user interfaces that implement aspects of the disclosure.

FIG. 4 shows an example user interface of the vehicle user device 151 and/or 205 after the user of the disabled vehicle has been asked or prompted to continue a roadside service request over a mobile application or website while simultaneously being engaged in voice communication (e.g., over the telephone) with the live agent or interactive voice response system (e.g., at or after step 308). Thus, the user of the disabled vehicle, while engaged in voice communication (e.g., over the telephone), may receive an electronic message 402 (e.g., a text or SMS message). The electronic message 402 may read, for example, "We noticed you called. For roadside assistance, tap the link to request help" with a link or other functionality allowing the user of the disabled vehicle to access the roadside service application. As indicated through the other functionalities (e.g., buttons) on the user interface (e.g., mute 404, keypad 406, speaker 408, end call 410), the user may still be in voice communication (e.g., "on call") with the live agent or interactive voice response system while receiving the electronic message 402, and may thus have the ability to use functionalities associated with an ongoing call. For example, the user of the disabled vehicle may have the option to end the voice communication via the end call functionality 410, e.g., to focus on interacting with the roadside assistance application. However, as described herein, the simultaneous interaction between the digital interface of the roadside assistance application and the audio communication with the live agent or interactive voice response system may provide a sense of security and ease to the user of the disabled vehicle during a typically stressful time associated with a vehicle incident.

Figure 5:
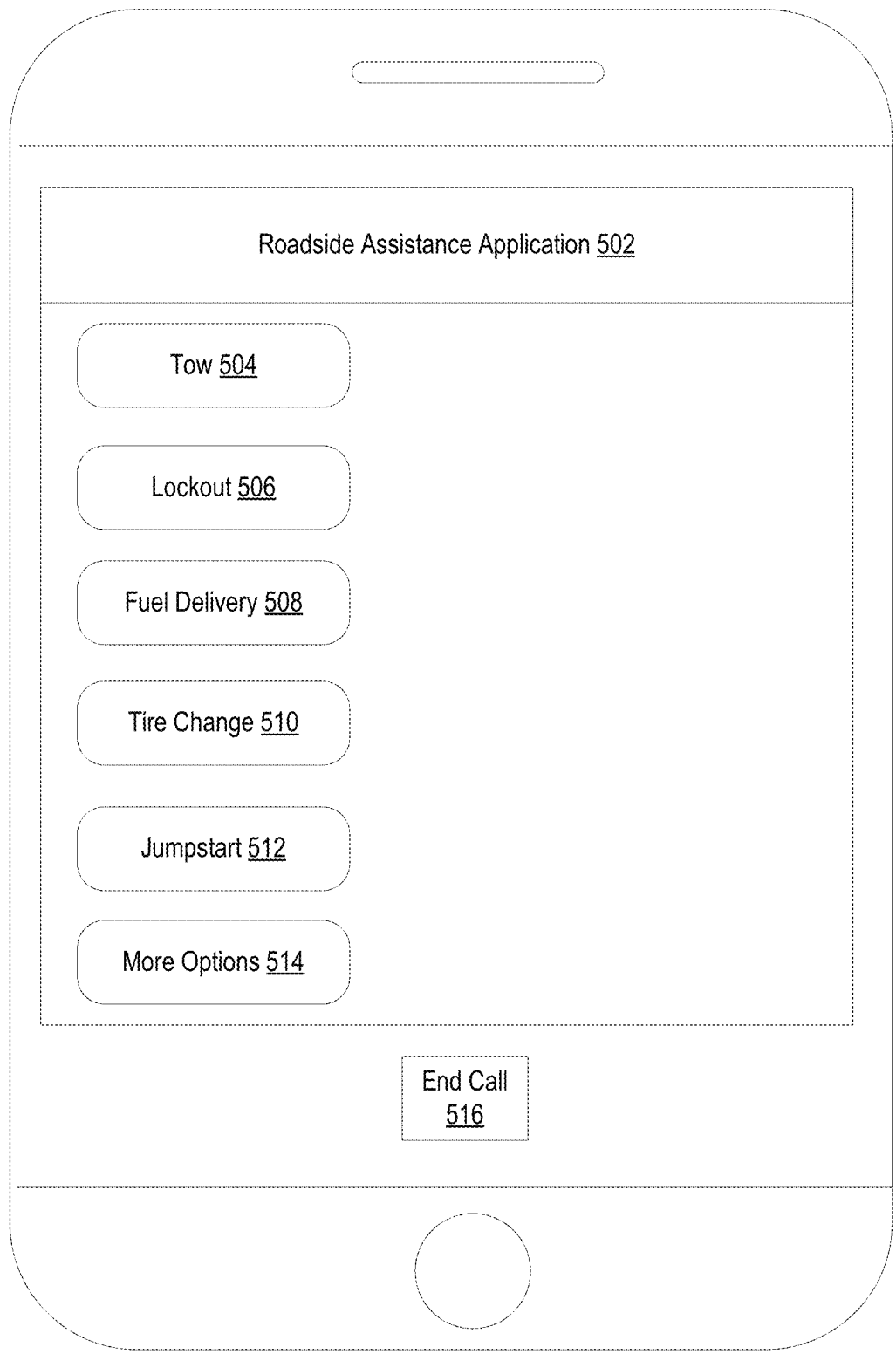

FIG. 5 shows an example user interface of the vehicle user device 151 and/or 205 after the user of the disabled vehicle has opened and/or executed the roadside assistance application. For example, the user interface may comprise a roadside assistance application window 502 with several options for the user of the disabled vehicle to select from. The options may indicate the type of roadside assistance that the user of the disabled vehicle may need and/or a cause for the disablement of the vehicle (e.g., a towing 504, a lockout 506, a fuel delivery 508, a tire change 510, a jumpstart 512, etc.). A selection, by the user of the disabled vehicle, of any one or more of these options may cause the roadside assistance unit 211 to receive one or more parameters describing the vehicle incident undergone by the vehicle 201 associated with the user of the disabled vehicle. Parameters for a vehicle incident may include, but are not limited to, one or more of an identification of the vehicle, a cause of the vehicle incident, a type of damage experienced by the vehicle, a severity of damage experienced by the vehicle, parameters of other vehicles involved in the vehicle incident (e.g., when the vehicle incident is a multiple car collision), or a type of roadside service requested. Parameters for a vehicle incident may be received throughout the process described in method 300 as shown in FIG. 3, and may be stored, e.g., in one or more data structures assigned for a vehicle incident in database 225 of the roadside assistance unit 211.

When a roadside service has been completed and/or when a disabled vehicle has been restored, the roadside assistance unit 211 may indicate that accordingly. For example, the roadside assistance unit 211 may update the one or more data structures associated with the roadside service request accordingly. The user of the disabled vehicle may be provided additional options (e.g., more options 514) or may be provided with the ability to manually enter in a type of roadside assistance needed or a cause for the disablement of the vehicle (e.g., as user input in natural language). In some aspects, natural language processor associated with the roadside assistance unit 211 (e.g., NLP 216A) may process the manually entered input to identify one or more parameters describing the vehicle incident undergone by the disabled vehicle.

Figure 6:
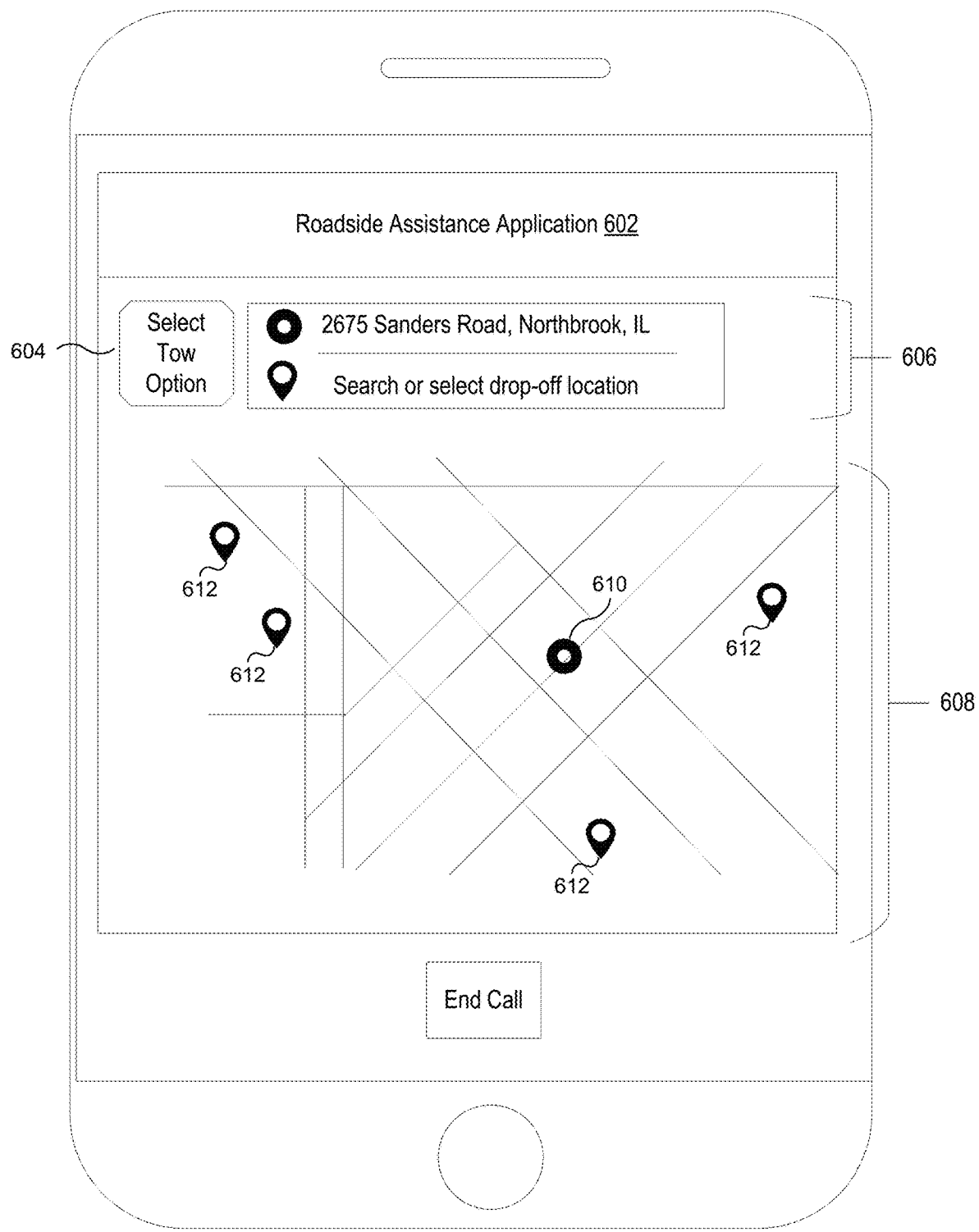

FIG. 6 shows an example user interface of the roadside assistance application running on the vehicle user device 151 and/or 205. As shown in FIG. 6, the example user interface may illustrate a scenario where the user of the disabled vehicle has indicated that a towing service is needed (e.g., by selecting the option "Tow" 504 in FIG. 5). In the roadside application window 602, the user interface may prompt the user to select a tow option 604. For example, as shown in marker 606, the user may be prompted to confirm the location of the disabled vehicle to be picked up, and enter a desired service provider. In some aspects (e.g., where the requested roadside service is a towing service), the location of the service provider may also be a drop off location for the disabled vehicle.

As discussed earlier, the location of the disabled vehicle may be determined by the roadside assistance unit 211 by receiving location data from a GPS system of the vehicle user device and/or of the disabled vehicle (e.g., by establishing connections with the telematics system of the disabled vehicle). The user interface of the roadside assistance application may display a map 608 based on the location of the disabled vehicle and/or the vehicle user device (e.g., as shown by marker 610). The map may indicate various locations of towing service providers 612 for the user of the disabled vehicle to select from. The roadside assistance unit 211 may determine a list of service providers (e.g., towing service providers 612) based on the one or more parameters of the vehicle incident and/or based on proximity to the location of the disabled vehicle and/or vehicle user device. The respective locations of the determined list of service providers may be shown on a map, as indicated in FIG. 6.

For example, the roadside assistance unit 211 may identify (e.g., from a registry of service providers stored in database 225), a set of service providers that satisfy a threshold of proximity to the location of the disabled vehicle and/or the vehicle user device. The threshold may be based on radial distance, and/or commute time. Furthermore, the threshold may be predetermined and/or manually set by the vehicle user. The roadside assistance unit 211 may identify, within the set of service providers and based on one or more parameters associated with the vehicle incident, a subset of service providers that are indicated as having the capability to address the vehicle incident. The one or more parameters may be determined from user input, e.g., via the roadside assistance application. Also or additionally, the interactive voice response system or the live agent may use received natural language communication from the user of the disabled vehicle to determine one or more parameters describing the vehicle incident. After identifying the subset of service providers, the roadside assistance unit 211 may send, to the subset of service providers, a task request to address the vehicle incident for the disabled vehicle. For example, computing devices used by the identified subset of service providers (e.g., service provider computing devices 207A-207N) may receive a notification that the user of the disabled vehicle needs roadside assistance. Each service provider of the subset provider may be given information on how far the disabled vehicle driver is from the service provider and that the service provider has the capability to provide the needed roadside service (e.g., based on the one or more parameters of the vehicle incident). The service provider may have the option to accept or decline the task request. The roadside assistance unit 211 may receive, from one or more service providers of the subset of service providers, an acceptance of the task request. Those service providers that accepted the task request may be presented to the vehicle user to choose from (e.g., by showing the locations of those service providers on a map, as in FIG. 6).

Also or alternatively, the user of the disabled vehicle may have the option to manually enter a drop-off location for the disabled vehicle and/or the user of the disabled vehicle. For example, the user of the disabled vehicle may be able to instruct a towing service provider, via the roadside service application, to drop off the user of the disabled vehicle at a location other than the drop-off location of the vehicle.

Figure 7:
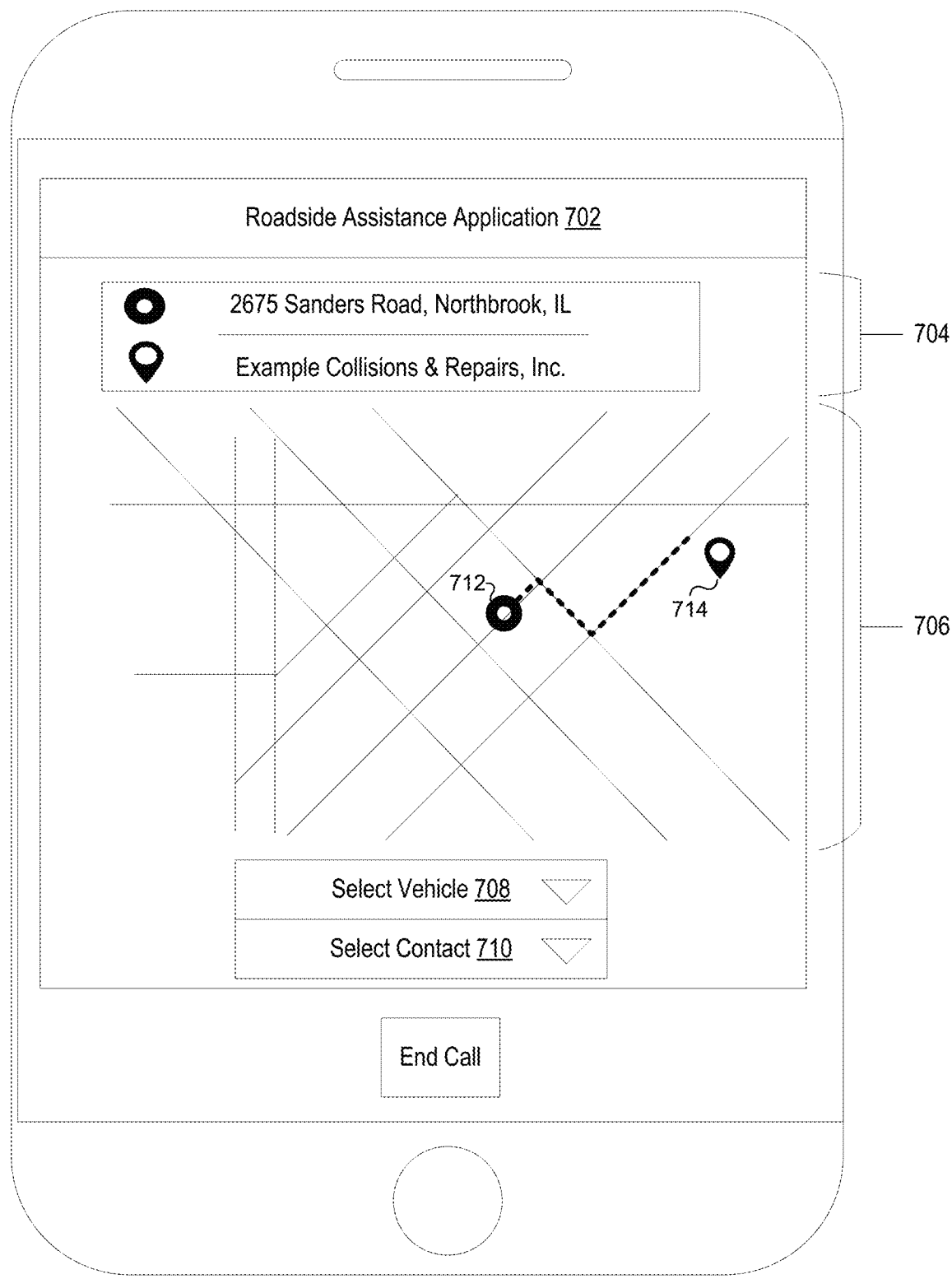

FIG. 7 shows an example user interface of the roadside assistance application running on the vehicle user device 151 and/or 205, after a vehicle user has selected a service provider. As shown in the roadside assistance application window 702, the vehicle user may have indicated a location for the disabled vehicle and/or vehicle user device, and the location of the service provider's place of business. For example, as shown in marker 704, the user of the disabled vehicle may have selected Example Collisions & Repair for the service provider (e.g., a towing service).

In the example shown in FIG. 7, the location of the service provider (Example Collisions & Repair) is also the drop-off location of the disabled vehicle. In some aspects, however, the location of the service provider need not also be the drop-off location of the vehicle. Furthermore, depending on the type of roadside assistance that is being requested, there need not be a drop-off location for the disabled vehicle. For example, if the user of the disabled vehicle requested roadside assistance to jumpstart the disabled vehicle, the user interface of the roadside service application may provide the vehicle user with the ability to choose a service provider (e.g., based on distance), and show a map to indicate movement of the service provider towards the disabled vehicle. However, after the disabled vehicle has been jumpstarted, the roadside service may be deemed as completed, and the vehicle user may resume using the vehicle at the vehicle's location.

As shown in FIG. 7, the user interface of the roadside service application may display a map 706, which is based on the location of the disabled vehicle and/or vehicle user device (e.g., as in marker 712). The map 706 may show the location of the service provider 714 and show the projected route and/or the movement of the service provider, in real-time, towards the location of the disabled vehicle and/or vehicle user device 712. Also or additionally, the roadside service application may prompt the vehicle user to provide an identification of the disabled vehicle (e.g., as shown by "Select Vehicle" 708) and/or a contact information (e.g., name, phone number, email, etc.) of the vehicle user (e.g., as shown by "Select Contact" 710). The service provider may use the identification of the disabled vehicle and/or the contact information to find the disabled vehicle and/or the user of the disabled vehicle, respectively. For example, a vehicle user that is registered with the roadside assistance unit 211 may have several vehicles registered under the user's profile, and/or may have several different contacts (e.g., other phone numbers, other emails, contact information of family members, etc.) registered under the user's profile. The vehicle user may thus be prompted to choose the appropriate vehicle and/or contact as indicated by markers 708 and 710, respectively.

Figure 8:
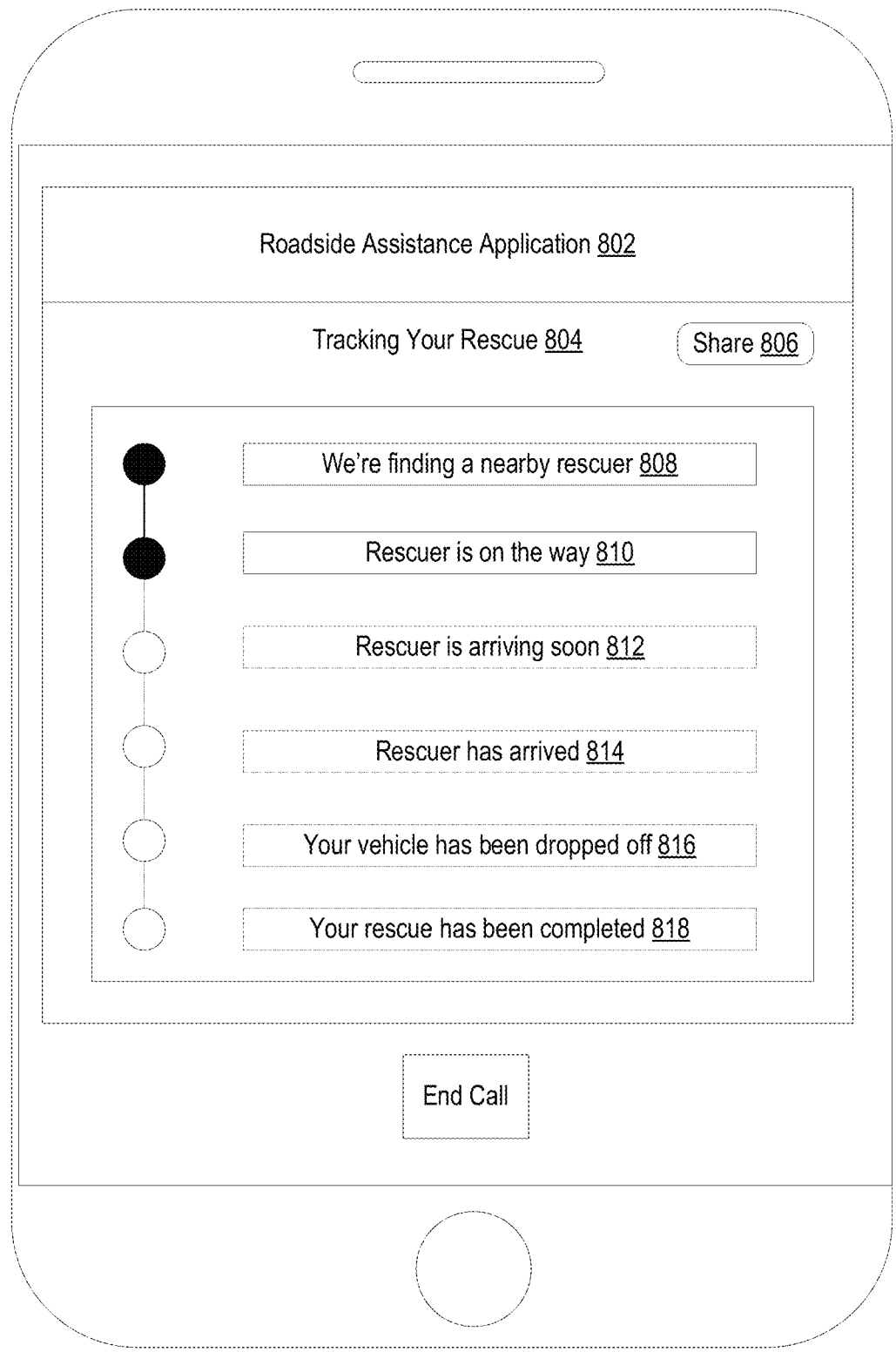

FIG. 8 shows an example user interface of the roadside assistance application running on the vehicle user device 151 and/or 205, and displaying a service status of a roadside service (e.g., a location or proximity of the service provider vehicle with respect to the disabled vehicle and/or the user of the disabled vehicle, and/or a stage or progress associated with the roadside service). The user interface may comprise a roadside assistance application window 802 showing the service status, which may be determined and monitored by the roadside assistance unit 211. For example, after the vehicle user has selected a service provider, the roadside service unit 211 may establish communications with a computing device used by the service provider (e.g., one of the service provider computing devices 207A-207N) to monitor the service status. Specifically, the roadside service unit 211 may obtain locational information from a GPS device of the computing device used by the service provider. Also or alternatively, the service provider may send service status information by way of user input into the roadside assistance application running or executing on the service provider's computing device.

As shown in FIG. 8, at least one way that the roadside assistance application may display the service status of the roadside service to the vehicle user is by indicating the process of procuring a service provider and tracking the service provider's activity (e.g., as shown in "Tracking Your Rescue" window 804). The vehicle user may share the tracked activity with other contacts (e.g., contacts of the vehicle user's family or friends saved in the vehicle user device) via the share feature 806 of the roadside service application. For example, after the roadside assistance unit 211 has received one or more parameters for the vehicle incident for which roadside assistance is requested (e.g., by way of the vehicle user choosing a type of roadside service, as shown in FIG. 5), and/or after the roadside assistance unit 211 has received the location of the disabled vehicle or the vehicle user device, the roadside assistance unit 211 may proceed to determine a list of service providers using the methods previously discussed.

The roadside assistance application may thus indicate this activity of procuring service providers with the service status "We're finding a nearby rescuer" 808. After the vehicle user has selected a service provider, and the service provider has been informed accordingly, the roadside assistance application may indicate the service status "Rescuer is on the way" 810. The selected service provider's journey to the location of the disabled vehicle or the location of the user of the disabled vehicle may be tracked via communication with a GPS device in the service provider vehicle or service provider computing device. At a specific point in the service provider vehicle's journey to the location of the disabled vehicle or to the location of the vehicle user device, the roadside application may display the service status "Rescuer is arriving soon" 812. The specific point may be based on a predetermined threshold of completion of the journey (e.g., a percent of the distance towards the location having been completed, a remaining time to the location being within a threshold time, etc.). The roadside application may display the service status "Rescuer has arrived" 814 upon arrival at the location of the disabled vehicle or the location of the vehicle user device. If, for example, the service provider is a towing service provider, and the disabled vehicle is to be dropped off, e.g., at the service provider's place of business, the roadside application may display the service status "Your vehicle has been dropped off" 816 as the service provider reaches the drop-off location. Furthermore, if a requested roadside service has been completed, the roadside service unit 211 may indicate "Your rescue has been completed" 818. In some aspects, the indicator may require an approval by the vehicle user.

While the aspects described herein have been discussed with respect to specific examples including various modes of carrying out aspects of the disclosure, those skilled in the art will appreciate that there are numerous variations and permutations of the above described systems and techniques that fall within the spirit and scope of the invention. For example, features and/or steps of the above described aspects may be combined, divided, omitted, rearranged, revised, and/or augmented in any desired manner. Various alterations, modifications, and improvements will readily occur to those skilled in the art. Such alterations, modifications, and improvements are intended to be part of this description, though not expressly stated herein, and are intended to be within the spirit and scope of the disclosure. Accordingly, the foregoing description is by way of example only, and is not limiting.

What is claimed is:

1. A method comprising:
   receiving, by a computing device having one or more processors and using an interactive voice response (IVR) system having a natural language processor a voice request from a mobile device for a roadside service for a vehicle that has undergone a vehicle incident, wherein:
   the vehicle and the mobile device are associated with a user of the vehicle that has undergone the vehicle incident, and
   the voice request includes an identifier, identified by the IVR system, associated with the mobile device;
   sending, by the computing device and using the identifier, an electronic message to the mobile device, wherein the electronic message prompts the user to access a roadside assistance application;
   receiving, by the computing device and via the roadside assistance application, a plurality of parameters associated with the vehicle incident, the plurality of parameters being encrypted via data transmission protocols of a security layer connecting the computing device and the mobile device;
   transmitting a prompt to the mobile device with voice interactions using the natural language processor of the IVR system, the prompt asking to continue a roadside service over the roadside assistance application synchronously with voice interactions;
   determining, by the computing device, a location of the vehicle by both of:
   receiving, from a global positioning (GPS) of the vehicle, the location of the vehicle; and
   receiving, via a user input into the roadside assistance application at the mobile device, the location of the vehicle;
   identifying, by the computing device, based on the location, and based on the plurality of parameters associated with the vehicle incident, a list of service providers to provide roadside service;
   receiving, by the computing device and via the roadside assistance application, a selection of a service provider from the list of service providers;
   establishing communication with a second device associated with the service provider to monitor service status of the service provider;
   causing display, via the roadside assistance application, of the service status of the service provider; and
   receiving, by the computing device, an indication of the service provider completing the roadside service.

2. The method of claim 1, wherein the identifying the list of service providers comprises:
   identifying, from a database of service providers, a set of service providers that satisfy a threshold of proximity to the location;
   identifying, within the set of service providers and based on the plurality of parameters associated with the vehicle incident, a subset of service providers that are indicated as having a capability to address the vehicle incident;

sending, by the computing device and to the subset of service providers, a task request to address the vehicle incident; and receiving, by the computing device and from one or more service providers of the subset of service providers, an acceptance of the task request, wherein the one or more service providers of the subset of service providers comprises the identified list of service providers.

3. The method of claim 2, wherein the identified list of service providers comprises a single service provider, and wherein the receiving the selection of the service provider comprises:

receiving, from the mobile device, an approval of the single service provider.

4. The method of claim 1, wherein the roadside assistance application is hosted by a server of the computing device.

5. The method of claim 1, further comprising, prior to the sending the electronic message to the mobile device, authenticating, by the computing device, the mobile device that generated the voice request.

6. The method of claim 5, wherein the authenticating comprises, one or more of:

matching, by the computing device and via a database, the user associated with the mobile device to a registered user;

matching, by the computing device and via a database, the vehicle associated with the user associated with the mobile device to a registered vehicle; or matching, by the computing device and via a database, the mobile device to an identified device of a registered user or an identified device of a registered vehicle.

7. The method of claim 1, further comprising:

prior to the sending the electronic message to the mobile device, generating a data structure indicating a task to address the vehicle incident for the vehicle; and after the receiving the indication of the service provider completing the roadside service, updating the data structure to indicate a fulfillment of the task to address the vehicle incident for the vehicle.

8. The method of claim 1, wherein the determining the location of the mobile device comprises:

receiving, from a global positioning system (GPS) of the mobile device, the location of the mobile device.

9. The method of claim 1, wherein the establishing communications with the second device associated with the service provider to monitor the service status of the service provider comprises:

establishing communication with a global positioning system (GPS) of the second device associated with the service provider to monitor movement of the service provider; and wherein the causing the display of the service status of the service provider comprises causing display at least one of:

an estimated time of arrival of the service provider at the location of the vehicle;

an indication that the service provider is arriving at the location of the vehicle;

an indication that the service provider has dropped off the vehicle to a second location;

the indication of the service provider completing the roadside service; or a map overlaid with an indicator of the service provider to show movement of the service provider.

10. The method of claim 1, wherein the plurality of parameters associated with a vehicle incident comprises at least one of:

an identification of the vehicle;
a cause of the vehicle incident;
a type of damage experienced by the vehicle; or
a type of roadside service requested.

11. The method of claim 1, further comprising prompting the user to send an identification of the vehicle, and contact information associated with the user, by presenting a prompt synchronously with voice interactions with the natural language processor of the IVR system.

12. The method of claim 1, further comprising prompting the user to provide, at the mobile device, a selection of the vehicle from a plurality of vehicles associated with a user profile of the user.

13. The method of claim 1, wherein transmitting the prompt asking whether to continue a roadside service over one of a mobile application or a website, further comprises transmitting, in response to an acceptance of the prompt, status updates of the roadside service via the IVR system.

14. The method of claim 1, further comprising receiving a selection of the roadside service from a presentation of options of:

a towing service;
a lockout service;
a duel delivery service;
a tire change service; and
a jump-start.

15. A method comprising:

receiving, by a computing device having one or more processors and using an interactive voice response (IVR) system having a natural language processor a voice request from mobile device for a roadside service for a vehicle that has undergone a vehicle incident, wherein:

the vehicle and the mobile device are associated with a user of the vehicle that has undergone the vehicle incident, and the voice request includes an identifier, identified by the IVR system, associated with the mobile device;

determining whether a carrier of the mobile device supports synchronous use of phone service and mobile data;

sending, by the computing device and using the identifier, an electronic message to the mobile device, wherein the electronic message prompts the user to access a roadside assistance application;

prompting the user to provide, at the mobile device, a selection of the vehicle that has undergone the vehicle incident from a plurality of vehicles associated with the user of the vehicle that has undergone the vehicle incident;

receiving, by the computing device and via the roadside assistance application, a plurality of parameters associated with the vehicle incident, the plurality of parameters being encrypted via data transmission protocols of a security layer connecting the computing device and the mobile device;

transmitting a prompt to the mobile device with voice interactions using the natural language processor of the IVR system, the prompt asking to continue a roadside service over the roadside assistance application synchronously with voice interactions;

determining, by the computing device and via the mobile device, a location of at least one of the mobile device or the vehicle;

identifying, by the computing device, based on the location, and based on the plurality of parameters associated with the vehicle incident, a list of service providers to provide roadside service;

receiving, by the computing device and via the roadside assistance application, a selection of a service provider from the list of service providers;

establishing communication with a service provider device associated with the service provider to monitor service status of the service provider;

causing display, via the roadside assistance application, of the service status of the service provider; and receiving, by the computing device, an indication of the service provider completing the roadside service.

16. A method comprising:

receiving, by a computing device having one or more processors and using an interactive voice response (IVR) system having a natural language processor a voice request from mobile device for a roadside service for a vehicle that has undergone a vehicle incident, wherein:
- the vehicle and the mobile device are associated with a user of the vehicle that has undergone the vehicle incident, and
- the voice request includes an identifier, identified by the IVR system, associated with the mobile device;

sending, by the computing device and using the identifier, an electronic message to the mobile device, wherein the electronic message prompts the user to access a roadside assistance application;

receiving, by the computing device and via the roadside assistance application, a plurality of parameters associated with the vehicle incident, the plurality of parameters being encrypted via data transmission protocols of a security layer connecting the computing device and the mobile device;

presenting a prompt, at the mobile device, asking to continue a roadside service over one of a mobile application or a website, synchronously with voice interactions using the natural language processor of the IVR system;

determining, by the computing device and via the mobile device, a location of at least one of the mobile device or the vehicle;

identifying, by the computing device, based on the location, and based on the plurality of parameters associated with the vehicle incident, a list of service providers to provide roadside service;

receiving, by the computing device and via the roadside assistance application, a selection of a service provider from the list of service providers;

establishing communication with a service provider device associated with the service provider to monitor service status of the service provider;

causing display, via the roadside assistance application, of the service status of the service provider; and receiving, by the computing device, an indication of the service provider completing the roadside service.

* * * * *